United States Patent
Otsuka (10) Patent No.: US 7,246,863 B2
(45) Date of Patent: Jul. 24, 2007

(54) ELECTROMAGNETIC VALVE UNIT

(75) Inventor: Yukinori Otsuka, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/812,913

(22) Filed: Mar. 31, 2004

(65) Prior Publication Data

US 2004/0239178 A1 Dec. 2, 2004

(30) Foreign Application Priority Data

May 26, 2003 (JP) .............................. 2003-147182

(51) Int. Cl.
*B60T 8/36* (2006.01)
(52) U.S. Cl. .................. 303/119.3; 303/119.2
(58) Field of Classification Search ............. 303/119.2, 303/119.3, DIG. 10; 251/129.15, 129.01; 137/596.17, 884; 335/259, 267, 278, 281
See application file for complete search history.

(56) References Cited

U.S. PATENT DOCUMENTS 5,009,250 A * 4/1991 Kline et al. ............. 137/596.17
5,167,442 A * 12/1992 Alaze et al. ............. 303/113.2
5,458,150 A * 10/1995 Tamaoki et al. ........ 137/596.17
5,842,753 A * 12/1998 Staib et al. .............. 303/119.3
6,095,489 A * 8/2000 Kaneko et al. ......... 251/129.15

FOREIGN PATENT DOCUMENTS

| JP | 6-341568 A | 12/1994 |
| JP | 8-285114 A | 11/1996 |
| JP | 9-118215 A | 5/1997 |
| JP | 2605201 Y2 | 4/2000 |
| WO | WO 00/70628 | * 11/2000 |

* cited by examiner

*Primary Examiner*—Bradley King
(74) *Attorney, Agent, or Firm*—Foley & Lardner LLP

(57) ABSTRACT

An electromagnetic valve unit includes a yoke of magnetic metal. The yoke includes upper and lower walls that are integrally connected by side walls. A slit is provided by the upper wall of the yoke. The slit extends along a longitudinal axis of the yoke between axially opposed ends of the yoke. A plurality of electromagnetic valves are abreast installed in the yoke in such a manner that the yoke constitutes outside magnetic paths of solenoid coils of the valves. Each of the solenoid coils has terminal members that project outward from the yoke through the slit.

11 Claims, 6 Drawing Sheets

ELECTROMAGNETIC VALVE UNIT

BACKGROUND

The present invention relates, in general, to electromagnetic valves and more particularly to the electromagnetic valves of an integrated type that has a plurality of electromagnetic valves integrally installed therein.

Hitherto, various electromagnetic valve units have been proposed and put into practical use, particularly in the field of wheeled motor vehicles. One of them is shown in Japanese Utility Model Provisional Publication (Jikkaihei) 6-32863. To clarify the task of the invention, the electromagnetic valve unit disclosed in JP 6-32863 the will be briefly described.

The electromagnetic valve unit of JP 6-32863 comprises generally a rectangular parallelepiped yoke and a pair of electromagnetic valves installed in the yoke. That is, respective solenoid coils of the two electromagnetic valves are installed abreast in the yoke. The yoke has two through openings for mounting therein respective valve function parts of the two valves. When each solenoid coil is energized, a magnetic flux is generated using a part of the yoke as an outside magnetic path. Each solenoid coil has terminal members projected sideward therefrom and upon assembly, the terminal members are projected outward through openings that are formed in a longitudinal end of the yoke.

Usually, in an antilock brake system of wheeled motor vehicles, a plurality of electromagnetic valves are installed in a common block together with a control board, an electric motor, a fluid pump and their associated parts. Nowadays, to achieve a compact construction of the block, there has been proposed a layout wherein the control board is placed directly on the abreast arranged electromagnetic valves.

However, if such layout is practically employed with the aforementioned electromagnetic valve unit the electric connection between the valve unit and the control board would inevitably need a longer wiring because the terminal members of each solenoid coil are projected outward from the openings formed in the longitudinal end of the yoke, that is, from the openings that are positioned away from the control board. If, to shorten the wiring, the openings of the yoke (through which the terminal members are outward outwardly projected) are provided in an upper wall of the yoke that is positioned just below the control board, the work for assembling the solenoid coils to the yoke becomes difficult or at least troublesome.

An object of the present invention is. therefore, to provide an electromagnetic valve unit that is free of the aforementioned drawbacks.

SUMMARY

According to the present invention, there is provided an electromagnetic valve unit that comprises a plurality of solenoid coils, which are abreast installed in a common yoke and which have their connection terminals projected in the same direction, that is, toward a control board that is to be directly mounted on the yoke.

According to a first aspect of the present invention, there is provided an electromagnetic valve unit which comprises a yoke of magnetic metal, the yoke including upper and lower walls that are integrally connected by side walls; a slit provided by the upper wall of the yoke, the slit extending along a longitudinal axis of the yoke between axially opposed ends of the yoke; and a plurality of electromagnetic valves abreast installed in the yoke in such a manner that the yoke constitutes outside magnetic paths of solenoid coils of the valves, each solenoid coil having terminal members projected outward from the yoke through the slit.

According to a second aspect of the present invention, there is provided an electromagnetic valve unit which comprises a yoke of magnetic metal, the yoke including upper and lower walls that are integrally connected by side walls; a slit provided by the upper wall of the yoke, the slit extending along a longitudinal axis of the yoke between axially opposed ends of the yoke; and a plurality of electromagnetic valves abreast installed in the yoke in such a manner that the yoke constitutes outside magnetic paths of solenoid coils of the valves, each solenoid coil having terminal members projected outward from the yoke through the slit, wherein the solenoid coils of the electromagnetic valves are arranged along the longitudinal axis forming a given number of pairs of the coils along the same.

According to a third aspect of the present invention, there is provided an antilock brake system for a wheeled motor vehicle, which comprises a fluid line extending between a master cylinder of a brake pedal and brake cylinders of road wheels; and an electromagnetic valve unit arranged in the fluid line to selectively establish open and close the passage of the fluid line, the electromagnetic valve unit comprising a yoke of magnetic metal, the yoke including upper and lower walls that are integrally connected by side walls; a slit provided by the upper wall of the yoke, the slit extending along a longitudinal axis of the yoke between axially opposed ends of the yoke; and a plurality of electromagnetic valves abreast installed in the yoke in such a manner that the yoke constitutes outside magnetic paths of solenoid coils of the valves, each solenoid coil having terminal members projected outward from the yoke through the slit.

BRIEF DESCRIPTION OF THE DRAWINGS

Other objects and advantages of the present invention will become apparent from the following description when taken in conjunction with the accompanying drawings, in which.

DETAILED DESCRIPTION

In the following, two embodiments 100 and 200 of the present invention will be described in detail with reference to the accompanying drawings.

For ease of description, various directional terms, such as, right, left, upper, lower, rightward and the like are used in the following description. However, such terms are to be understood with respect to only drawing or drawings on which the corresponding part or portion is shown.

Figure 1:
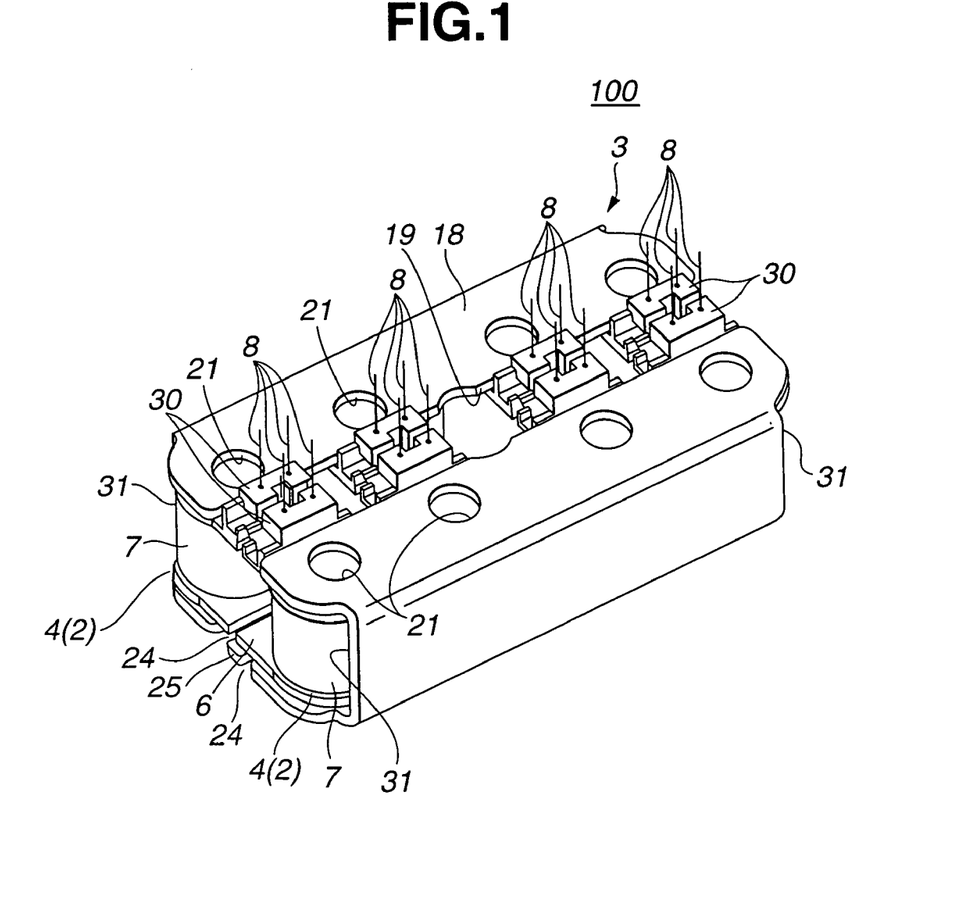
FIG. 1 is a perspective view of an electromagnetic valve unit which is a first embodiment of the present invention.
Figure 5:
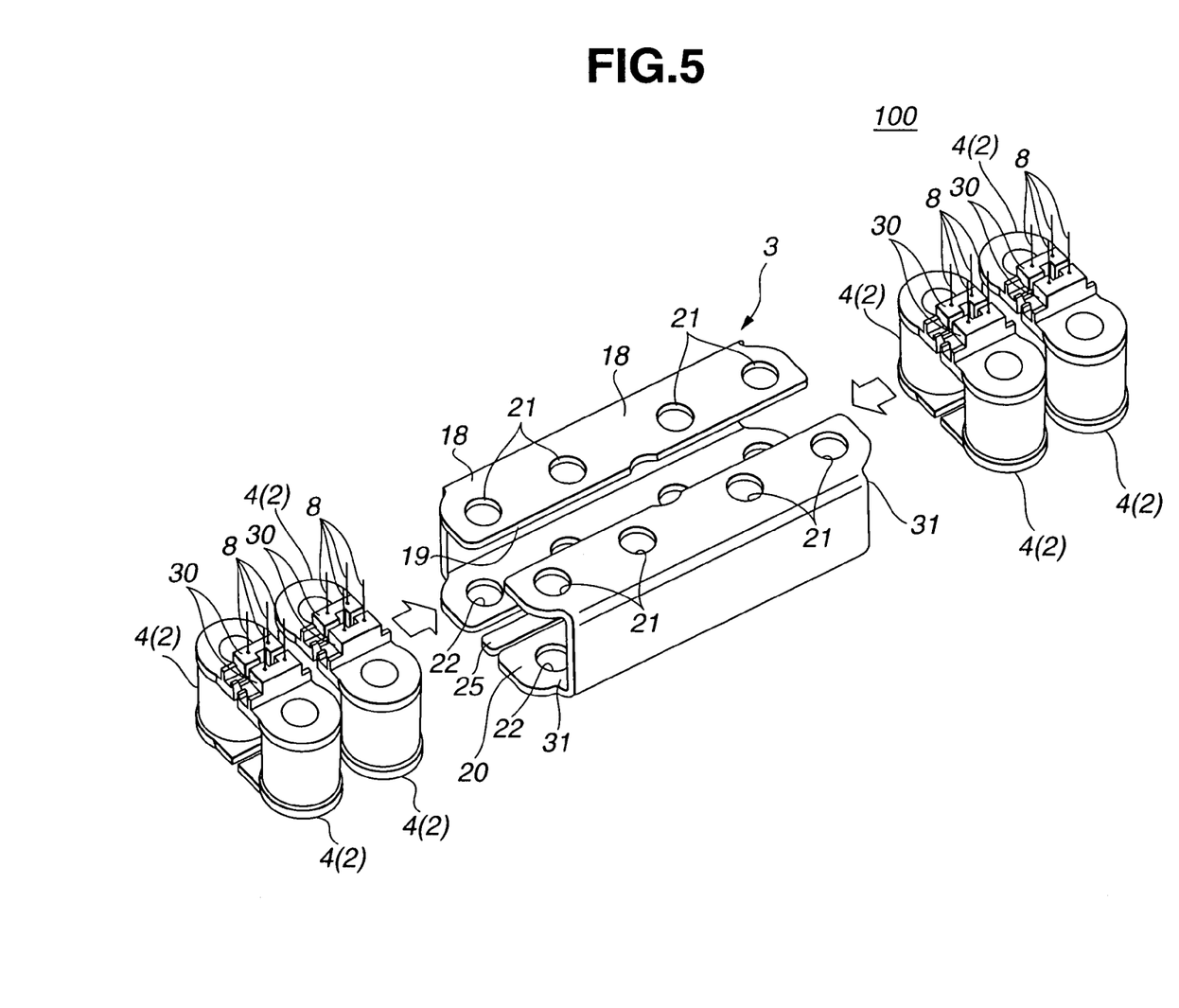
FIG. 5 is an exploded view of the electromagnetic valve unit of the first embodiment.

Referring to FIGS. 1 to 5, particularly FIGS. 1 and 5, there is shown an electromagnetic valve unit 100 that is the first embodiment of the present invention.

Electromagnetic valve unit 100 shown by the drawings is of a type that is installed in an automotive antilock brake system for controlling opening/closing of a fluid passage of the system. That is, the unit 100 is integrally installed in a block together with a control board, an electric motor, a fluid pump and their associated parts. Although not shown in the drawings, the control board is placed directly above electromagnetic valve unit 100.

As is best seenfrem in FIG. 5, in this first embodiment 100, eight electromagnetic valves 2 are installed in a common yoke 3. More specifically, four pairs of electromagnetic valves 2 are abreast arranged in common yoke 3 in order.

Figure 2:
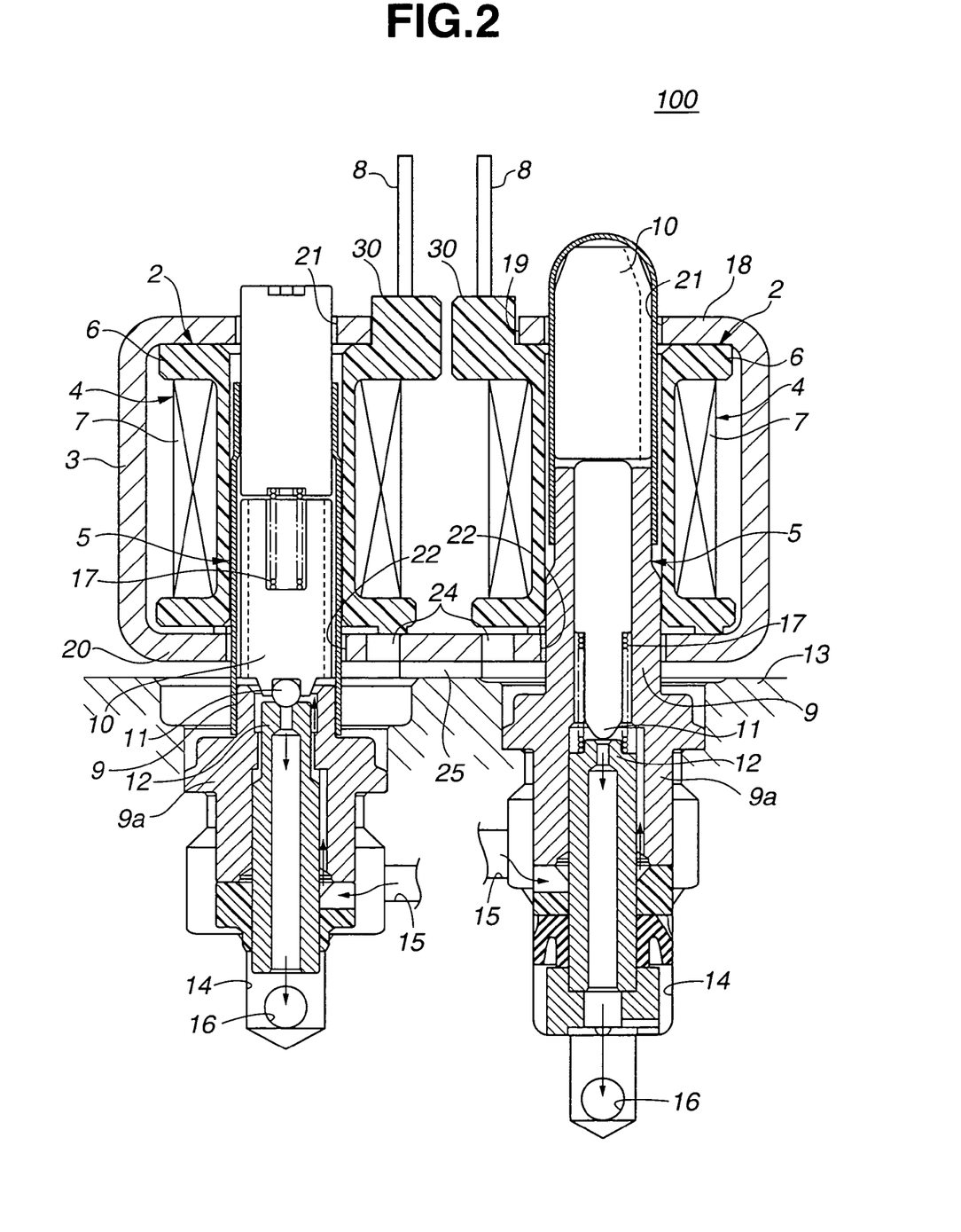
FIG. 2 is an enlarged sectional view of the electromagnetic valve unit of the first embodiment.

FIG. 2 shows, in a sectional manner, a pair of valves 2. Although these paired valves 2 have a slight difference in construction, their basic structures are generally the same. However, the left valve 2 is of a normally closed type and the right valve 2 is of a normally open type.

Each electromagnetic valve 2 generally comprises, in addition to the common yoke 3, a solenoid coil 4 and a valve function part 5, as main components. Solenoid coil 4 comprises a plastic bobbin 6 and a winding 7 disposed around bobbin 6.

As is understood from FIGS. 2 and 5, both terminal ends of each winding 7 are connected to respective terminal pins 8 and 8 that are embedded in a rectangular projection 30 provided by bobbin 6. That is, each bobbin 6 has, at an upper part, the rectangular projection 30 through which two terminal pins 8, 8 upwardly project.

It is to be noted that the terminal pins 8, 8 project axially outward with respect to the corresponding solenoid coil 4.

As is seen from FIG. 2, valve function part 5 comprises a tubular valve body 9 and an armature 10 axially movably received in valve body 9. A lower end of armature 10 is equipped with a valve member 11 that is capable of closing a passage defined by a valve seat 12. That is, when armature 10 is moved upward, valve member 11 opens the passage and when armature 10 is moved downward, valve member 11 closes the passage.

Tubular valve body 9 is tightly and concentrically received in a center bore of bobbin 6 of solenoid coil 4 and has a thicker lower portion 9a that is snugly put in a bore 14 formed in a metal housing 13 of the antilock brake system (ABS). Preferably, housing 13 is made of aluminum or the like.

Housing 13 is formed with first and second ports 15 and 16 that are exposed to the bore 14. That is, in response to the open and close actions of valve member 11 relative to the passage of valve seat 12, the fluid connection between first and second ports 15 and 16 is established and blocked respectively.

As is mentioned hereinabove, the left valve 2 is of a normally closed type. Thus, valve member (or valve ball) 11 is biased by a spring 17 in a direction to close the passage of valve seat 12. While, the right valve 2 is of a normally open type, and thus valve member 11 is biased by a spring 17 in a direction to open the passage of valve seat 12.

Figures 3, 4:
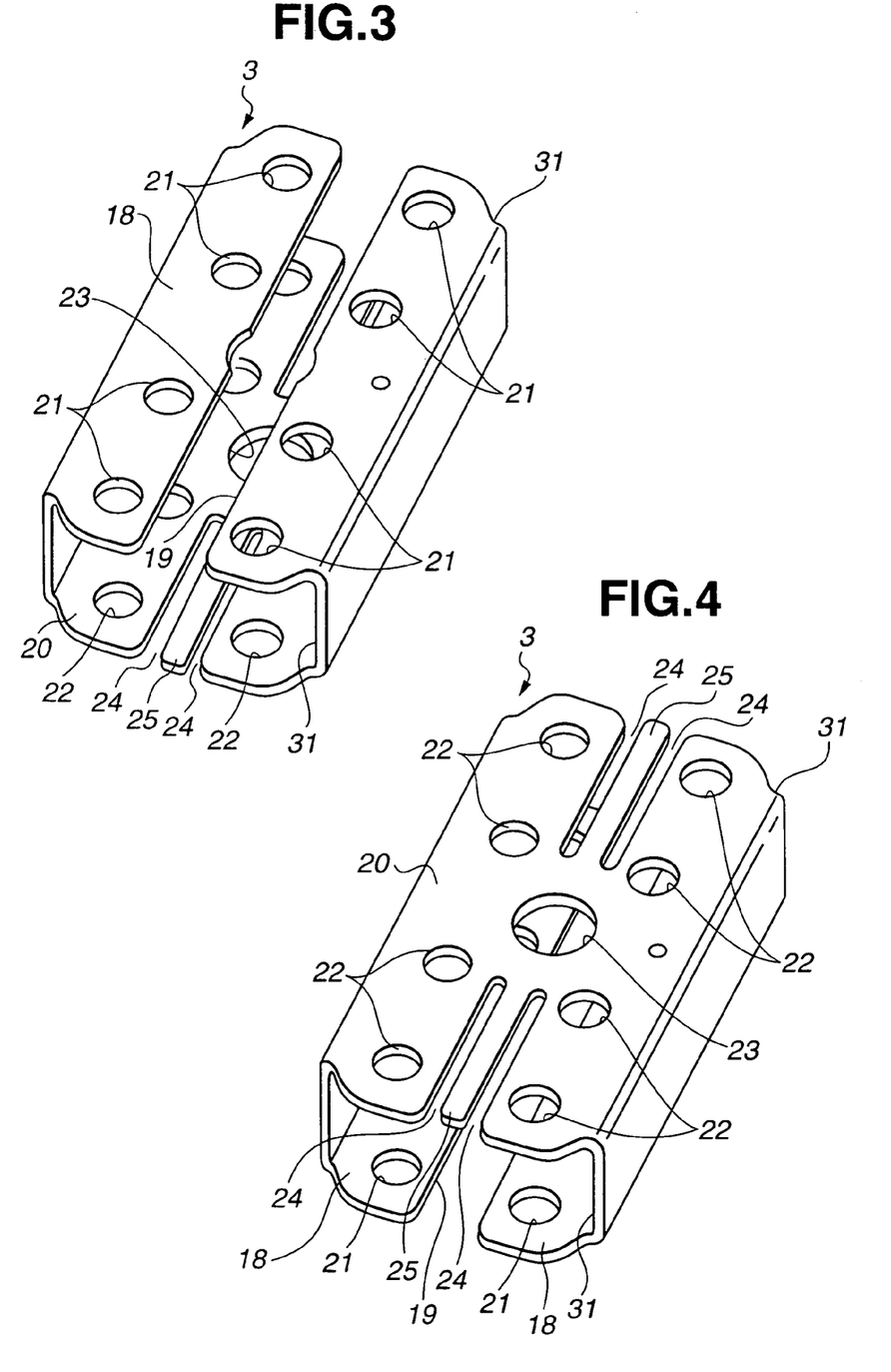
FIG. 3 is a front perspective view of a common yoke used in the electromagnetic valve unit of the first embodiment.
FIG. 4 is a back perspective view of the common yoke of FIG. 3.

Referring to FIGS. 3 and 4, there is clearly shown the common yoke 3 in a perspective manner. FIGS. 3 and 4 show front and rear views of yoke 3, respectively.

As is understood from FIG. 3, yoke 3 has a generally rectangular parallelepiped shape, that comprises upper and lower walls 18 and 20 and side walls (no numerals) each extending between upper and lower walls 18 and 20. That is, yoke 3 has a rectangular cross section when cut in an imaginary plane perpendicular to a longitudinal axis of the yoke 3.

Axially opposed ends of yoke 3 are opened, which are denoted by numerals 31 and 31 in the drawings.

As is seen from FIG. 3, upper wall 18 is formed at a middle portion thereof with a longitudinally extending slit 19. As will become apparent as the description proceeds, the yoke 3 is a device that creates outside magnetic paths. For this purpose, yoke 3 is constructed of a magnetic metal.

As is seen from FIGS. 1 and 5, within yoke 3, four pairs of electromagnetic valves 2 are abreast arranged in order in such a manner that the paired solenoid coils 4 of each pair of valves 2 face each other with respect to an imaginary plane that extends along the longitudinal axis of yoke 3. More specifically, the paired solenoid coils 4 of each pair of valves 2 are arranged having slit 19 placed therebetween.

As is seen from FIG. 5, when it is intended to assemble unit 100, the paired valves 2 are slid into yoke 3 from both open ends 31 of the same. In the illustrated embodiment, two pairs are led into yoke 3 from the right open end 31, and the other two pairs are led into yoke 3 from the left open end 31.

As is seen from FIG. 1, upon proper arrangement of valves 2 in yoke 3, rectangular projections 30 of the paired solenoid coils 4 of the valves 2 are neatly put in and projected upward from slit 19. Terminal pins 8 of solenoid coils 4 are thus projected upward as shown.

As is best seen from FIGS. 1, 2 and 3, upper wall 18 of yoke 3 is formed with eight circular openings 21 and also lower wall 20 of yoke 3 is formed with eight circular openings 22 that are aligned with the corresponding openings 21 to constitute eight pairs of aligned openings 21 and 22.

As is understood from FIGS. 1 and 2, each pair of the aligned openings 21 and 22 are arranged to install in yoke 3 the valve function part 5 of the corresponding electromagnetic valve 2.

As is seen from FIG. 2, rectangular projection 30 of each solenoid coil 4, that slidably contacts the edge of slit 19, can serve as a positioner for positioning the bobbin 6 relative to the aligned openings 21 and 22.

That is, as is seen from FIG. 5, each paired valves 2 can slide into desired positions of yoke 3 by sliding the paired projections 30 in and along slit 19 of yoke 3.

As is seen from FIGS. 3 and 4, lower wall 20 of yoke 3 is formed at a center area thereof with a circular opening 23 through which a bolt (not shown) passes to secure yoke 3 to housing 13. As is seen from FIG. 3, provision of slit 19 of yoke 3 facilitates the work for turning the bolt.

Furthermore, lower wall 20 is formed at each side area with two parallel slits 24 that define therebetween a longitudinally extending strip 25. The strips 25 are slightly bent outward from yoke 3, so that upon mounting of yoke 3 on housing 13, the strips 25 are resiliently pressed against housing 13 thereby to assure a tight connection of yoke 3 to housing 13.

As is best seen from FIG. 1, upon proper assembly of electromagnetic valve unit 100, all of terminal pins 8 of the unit are positioned at the upper side of yoke 3. Thus, when a control board (not shown) is brought onto the upper side of yoke 3, the terminal pins 8 can be automatically inserted into corresponding terminal openings provided in the control board thereby achieving an electric connection between the valve unit 100 and the control board. That is, the terminal openings are shaped to easily receive the terminal pins 8 and constructed to grasp the pins 8 when the control board is properly received on the upper side of the yoke 3.

In the following, advantages of electromagnetic valve unit 100 will be briefly described in the following.

First, as was just previously mentioned, upon putting of a control board onto the unit 100, the electric connection between the unit 100 and the control board is automatically and instantly achieved. That is, there is no need of using longer wiring for such connection, unlike in the case of the aforementioned JP 6-32863.

Second, mounting of the plurality of electromagnetic valves 2 in yoke 3 is easily carried out because valves 2 can be inserted into yoke 3 from both open ends 31 of yoke 3. During insertion of valves 2, the rectangular projections 30 of each paired valves 2 slide along slit 19 and thus serve as a guide means for properly positioning the paired valves 2 to their proper positions in yoke 3.

Third, because of provision of the longitudinally extending strips 25 that are slightly bent outward from yoke 3, yoke 3 can be resiliently pressed against housing 13 when connected to housing 13 through the connecting bolt (not shown). That is, undesired play of yoke 3 can be suppressed or at least minimized. The resiliency possessed strips 25 are easily provided by only providing yoke 3 with parallel slits 24. That is, the resilient pressing of yoke 3 to housing 13 is made without using separate spring member, which brings about a lower cost production of valve unit 100.

Fourth, each resiliency possessed strip 25 functions to disrupt the magnetic paths that are produced by the paired solenoid coils 4 that face each other having the two slits 24 put therebetween. Thus, undesired interference of magnetic flux between the paired solenoid coils 4 is suppressed or at least minimized, and thus, the valve performance of each electromagnetic valve 2 is improved.

Fifth, since the four pairs of valves 2 are abreast installed in yoke 3 in order, the valves 2 (more specifically, the solenoid coils 4 of the valves 2) can share the same magnetic path area on yoke 3 with one another. Thus, the magnetic path resistance can be lowered without increasing the thickness of yoke 3.

In the aforementioned first embodiment 100, four pairs of electromagnetic valves 2 are installed in yoke 3. If the length of yoke 3 is increased, more than four pairs can be installed.

Figures 6, 7:
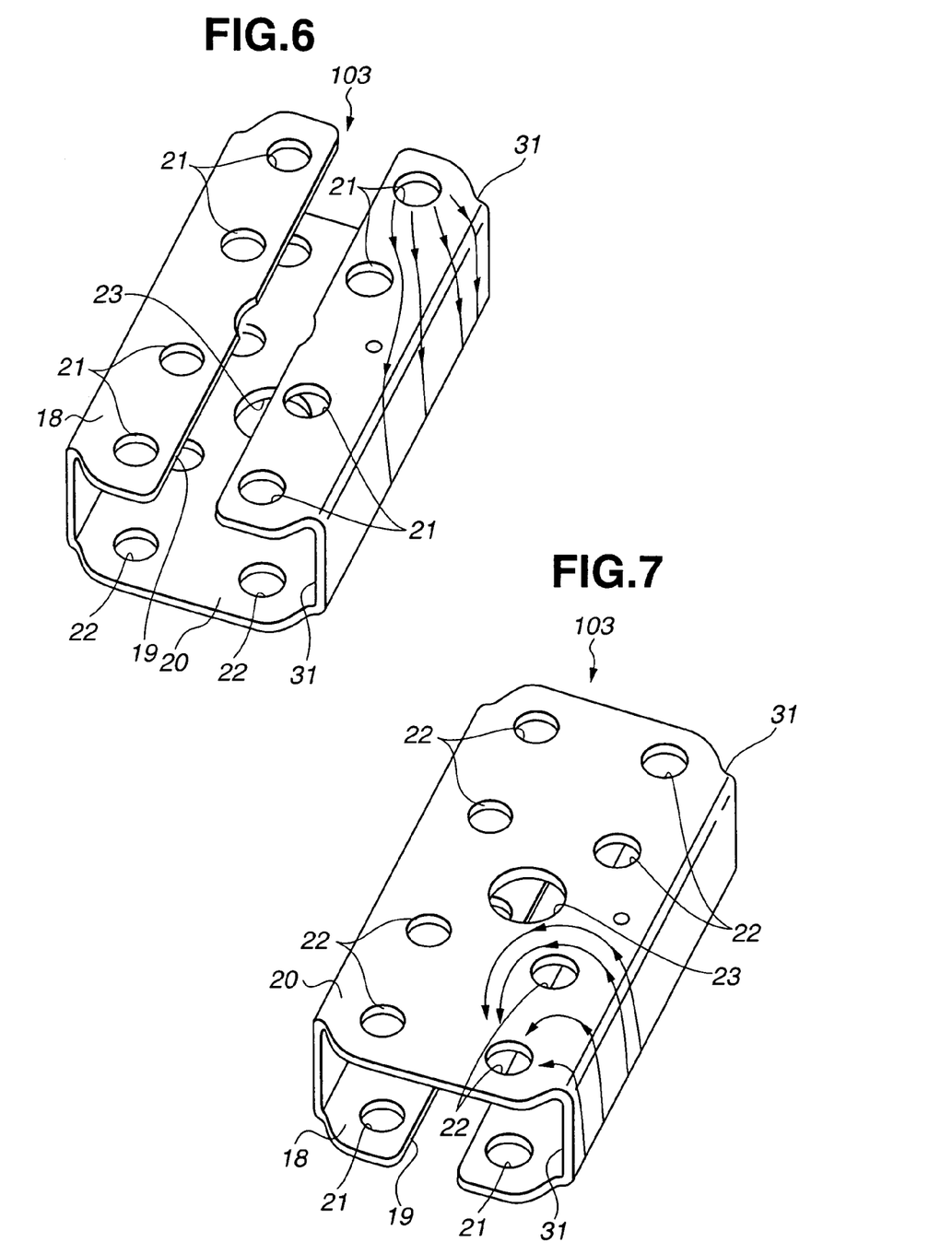
FIG. 6 is a front perspective view of a common yoke used in an electromagnetic valve unit of a second embodiment of the present invention.
FIG. 7 is a back perspective view of the common yoke of FIG. 6.
Figure 8:
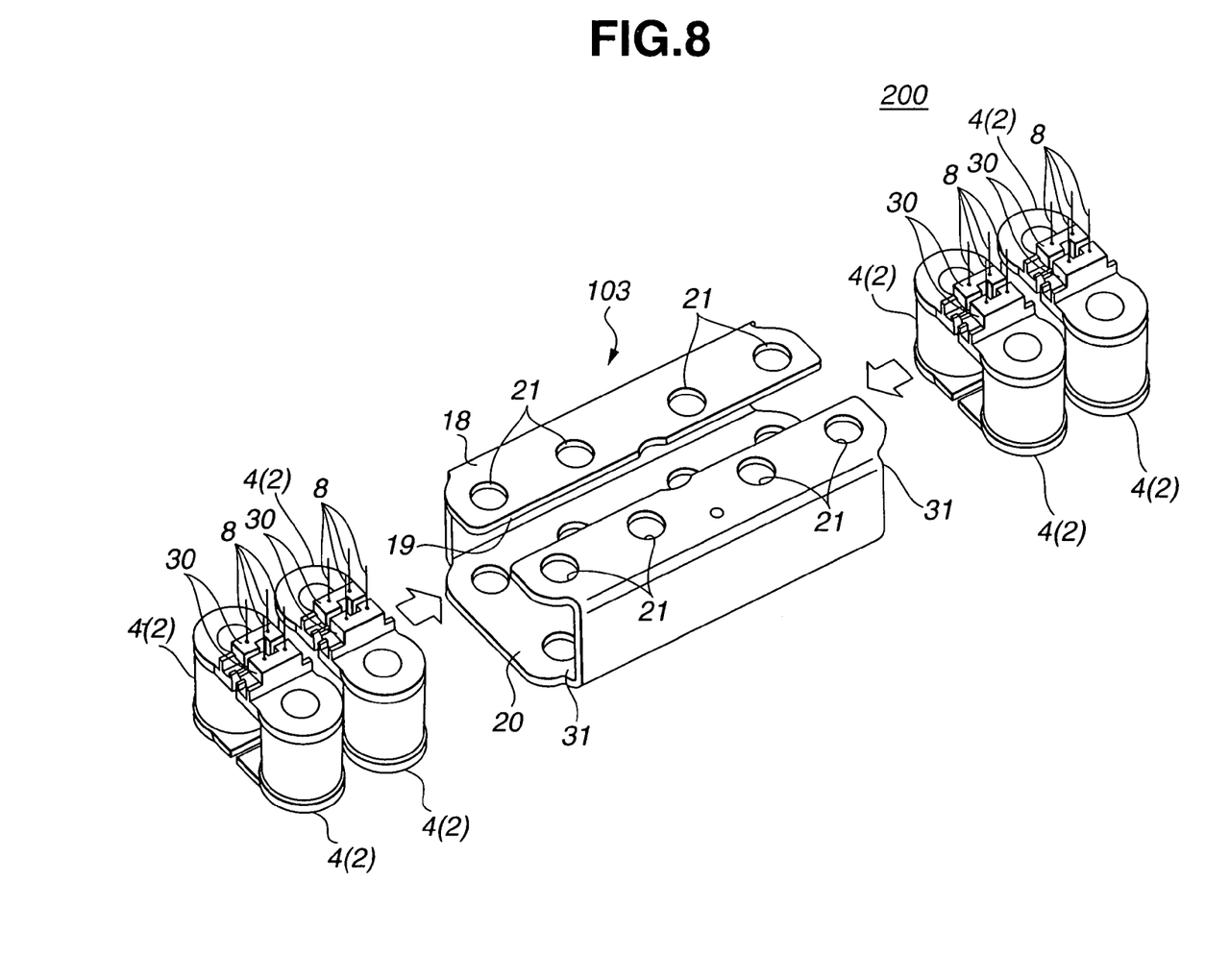
FIG. 8 is an exploded view of the electromagnetic valve unit of the second embodiment.

Referring to FIGS. 6 to 8, particularly FIG. 8, there is shown an electromagnetic valve unit 200 that is a second embodiment of the present invention.

As the unit 200 is similar to the unit 100 of the aforementioned first embodiment, only parts or portions that are different from those of the unit 100 will be described in detail in the following.

As is understood from FIG. 6, in this second embodiment 200, the common yoke 103 is much simpler than yoke 3 of the first embodiment 100.

That is, as is seen from FIG. 7, yoke 103 has no means or construction that corresponds to the longitudinally extending strips 25 (see FIG. 4) employed in the first embodiment 100.

Thus, when it is intended to mount yoke 103 onto housing 13 (see FIG. 2), a separate spring member (not shown) has to be put between yoke 103 and housing 13 so that yoke 103 can be resiliently pressed against housing 13.

As the basic structure of valve unit 200 is substantially identical to that of valve unit 100 of the first embodiment, substantially same advantages as those of the valve unit 100 except the third and fourth advantages are also obtained in the valve unit 200 of the second embodiment.

In addition to the aforementioned advantage, the valve unit 200 of the second embodiment has the following advantage.

That is, as lower wall 20 of yoke 103 has no structure corresponding to the longitudinally extending strips 25 employed in the first embodiment 100, the magnetic paths produced by the paired solenoid coils 4 can constitute continuous paths at lower wall 20.

Accordingly, as is seen from FIGS. 6 and 7, the magnetic fluxes of solenoid coils 4 installed in yoke 103 are forced to extend largely to a laterally center area of lower wall 20, which means an increase in the magnetic path section that is practically used by each valve 2 and thus the magnetic path resistance is lowered. Thus, the thickness of the common yoke 103 can be further reduced.

Modifications of the invention will hereafter be described.

In the aforementioned two embodiments 100 and 200, common yoke 3 or 103 that has both ends 31 opened is used. In such yoke 3 or 103, production is easily carried out with press working applied to a metal plate. If desired, a common yoke of a type having only one end opened may be used in the present invention.

Furthermore, in the present invention, it is not always necessary to arrange electromagnetic valves 2 in such a way that these valves 2 are installed in yoke 3 or 103 forming several pairs of them entirely along the longitudinal axis of yoke 3 or 103. Instead if desired, single valve or valves 2 may be arranged in the row of the paired valves 2.

In the disclosed first and second embodiments, electromagnetic valve units 100 and 200 are described as being applied to an automotive antilock brake system for controlling opening/closing of a fluid passage of the system. Of course, the units 100 and 200 may be applied to other systems that need to control the opening/closing of a fluid passage.

Figure 9:
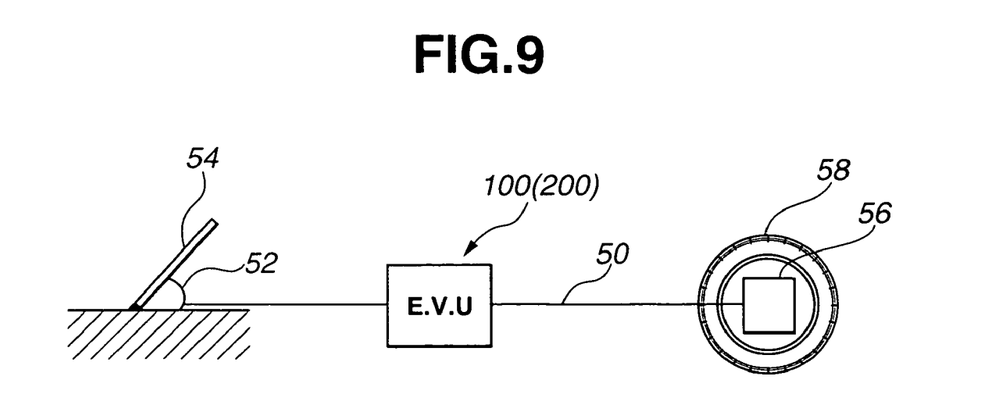
FIG. 9 is a schematic view of an automotive antilock brake system to which an electromagnetic valve unit of the present invention is practically applied.

Referring to FIG. 9, there is schematically shown an antilock brake system (ABS) for a wheeled motor vehicle, to which the electromagnetic valve unit 100 or 200 of the invention is practically applied. As shown, the unit 100 or 200 is arranged in a fluid line 50 that extends from a master cylinder 52 of a brake pedal 54 to brake cylinders 56 of road wheels 58 (only one is shown).

The entire contents of Japanese Patent Application 2003-147182 filed May 26, 2003 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. An electromagnetic valve unit comprising:
   a yoke of magnetic metal, the yoke comprising upper and lower walls that are integrally connected by side walls;
   a slit provided in the upper wall of the yoke, the slit extending along a longitudinal axis of the yoke between axially opposed ends of the yoke; and
   a plurality of electromagnetic valves abreast installed in the yoke in such a manner that the yoke constitutes outside magnetic paths of solenoid coils of the valves,
   wherein each solenoid coil has terminal members that project outward from the yoke through the slit,
   wherein the terminal members of every pair of the electromagnetic valves, which face each other with respect to the longitudinal axis of the yoke, are arranged close to one another and face one another, wherein the lower wall of the yoke comprises two axially extending wall portions that extend along the side walls respectively and a middle portion through which the two axially extending wall portions are integrally connected, and wherein the lower wall of the yoke is integrally formed with at least one strip that is angled relative to the lower wall, so that the strip exhibits a resiliency when pressed toward the lower wall, and wherein the strip extends axially outward from the middle portion of the lower wall of the yoke.

2. An electromagnetic valve unit as claimed in claim 1, wherein the strip of the yoke is provided by providing the lower wall of the yoke with axially extending parallel slits, the parallel slits defining therebetween the strip.

3. An electromagnetic valve unit as claimed in claim 1, wherein the yoke has a generally rectangular cross section and has longitudinally ends thereof opened.

4. An electromagnetic valve unit as claimed in claim 1, wherein the solenoid coils of the electromagnetic valves are arranged along the longitudinal axis forming a given number of pairs of the coils along the longitudinal axis.

5. An electromagnetic valve unit as claimed in claim 1, further comprising:
 a housing of an antilock brake system, onto which the yoke is tightly mounted,
 wherein the strip of the lower wall of the yoke is resiliently positioned between the lower wall of the yoke and the housing.

6. An electromagnetic valve unit as claimed in claim 5, wherein each of the solenoid coils of the electromagnetic valves has a projection that slidably contacts an edge of the slit of the upper wall of the yoke.

7. An electromagnetic valve unit as claimed in claim 5,
 wherein the housing has a plurality of bores in which respective valve function parts of the electromagnetic valves are received, and
 wherein the lower wall of the yoke is formed with a plurality of openings in which the valve function parts of the electromagnetic valves are received.

8. An electromagnetic valve unit as claimed in claim 7, wherein the yoke is rectangular parallelepiped in shape, wherein the yoke has axially opposed ends opened, wherein the electromagnetic valves are installed in the yoke in a manner to form a certain number of pairs thereof, wherein each of the two electromagnetic valves in each pair of electromagnetic valves are positioned at opposed portions with respect to an imaginary plane that extends in and along the slit and along the longitudinal axis of the yoke, wherein projections are provided on the solenoid coils of the electromagnetic valves, wherein the projections are received in the slit in a manner to form the certain number of pairs thereof, wherein each of the two projections in each pair of projections is in contact with laterally opposed edges of the slit, and wherein each projection receives therein the terminal members of the corresponding solenoid coil and has the terminal members projected outward therefrom.

9. An electromagnetic valve unit as claimed in claim 8, wherein each of the valve function parts comprises:
 a tubular valve body tightly and centrically received in a center bore of a bobbin of the solenoid coil;
 an armature axially movably received in the tubular valve body;
 a valve member held by the armature to move therewith;
 a valve seat to which the valve member is contactable to establish an/a open/close condition of a fluid passage; and
 a biasing member for biasing the armature in a given direction.

10. An electromagnetic valve unit as claimed in claim 9, wherein each of the tubular valve bodies has an upper portion received in a respective opening formed in the upper wall of the yoke and a lower portion received in a respective opening formed in the lower wall of the yoke.

11. An electromagnetic valve unit as claimed in claim 10, wherein the lower portion of each of the tubular valve bodies is received in a housing on which the lower wall of the yoke is mounted.

* * * * *